US010210020B2

(12) United States Patent
Nasser

(10) Patent No.: US 10,210,020 B2
(45) Date of Patent: Feb. 19, 2019

(54) SCHEDULING REQUESTS IN AN EXECUTION ENVIRONMENT

(71) Applicant: International Business Machines Corporation, Armonk, NY (US)

(72) Inventor: Samir A. Nasser, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 15/196,183

(22) Filed: Jun. 29, 2016

(65) Prior Publication Data
US 2018/0004569 A1 Jan. 4, 2018

(51) Int. Cl.
G06F 9/455 (2018.01)
G06F 9/48 (2006.01)
G06F 9/54 (2006.01)

(52) U.S. Cl.
CPC .......... G06F 9/4881 (2013.01); G06F 9/547 (2013.01)

(58) Field of Classification Search
CPC .................................................. G06F 9/4881
See application file for complete search history.

(56) References Cited

U.S. PATENT DOCUMENTS 6,125,394 A * 9/2000 Rabinovich ............. H04L 29/06
709/220
7,924,874 B2 4/2011 Powers
9,239,784 B1 * 1/2016 Haghighi ............ G06F 12/0246
2009/0328040 A1 * 12/2009 Miller ....................... G06F 9/54
718/100
2010/0199130 A1 8/2010 Rolia et al.
(Continued)

FOREIGN PATENT DOCUMENTS

KR 628821 B1 9/2006
WO 2006091269 A2 8/2006

OTHER PUBLICATIONS

Coffman et al., [online]; [retrieved on Feb. 12, 2016]; retrieved from the Internet http://www.ipd.anl.gov/anlpubs/2014/11/109821.pdf. "LAMMPS strong scaling performance optimization on Blue Gene/Q,", Nov. 10, 2014, 10pp.
(Continued)

Primary Examiner — Adam Lee
(74) Attorney, Agent, or Firm — Cantor Colburn LLP

(57) ABSTRACT

A computer-implemented method includes receiving a plurality of requests. Resource utilization is determined for two or more resources in an execution environment. An at-risk resource is identified, from among the two or more resources, with highest utilization among the two or more resources. The method further includes determining, by a computer processor, a subset of requests to be approved that are estimated to have lowest impact on the at-risk resource, based at least in part on historical resource utilization applicable to one or more request types of the plurality of requests. The subset of requests is approved for processing by the execution environment, where the subset of requests excludes one or more unapproved requests. The one or more unapproved requests are held in a waiting queue in lieu of processing the one or more unapproved requests, responsive to the one or more unapproved requests not being approved.

20 Claims, 5 Drawing Sheets

(56) References Cited

U.S. PATENT DOCUMENTS

| | | | | |
|---|---|---|---|---|
| 2010/0251263 | A1* | 9/2010 | Coelho | G06F 11/3433 719/314 |
| 2010/0257531 | A1* | 10/2010 | Barsness | G06F 9/4893 718/102 |
| 2011/0093854 | A1* | 4/2011 | Blanc | G06F 9/5066 718/101 |
| 2011/0231857 | A1* | 9/2011 | Zaroo | G06F 9/4881 718/104 |
| 2011/0289585 | A1 | 11/2011 | Zaitsev | |
| 2012/0079492 | A1* | 3/2012 | Chambliss | G06F 9/5083 718/104 |
| 2013/0055278 | A1* | 2/2013 | Zaitsev | G06F 12/0253 718/104 |
| 2014/0237472 | A1 | 8/2014 | Adogla et al. | |
| 2015/0143364 | A1* | 5/2015 | Anderson | G06F 9/5088 718/1 |
| 2015/0293787 | A1* | 10/2015 | Bilavarn | G06F 9/4881 718/102 |
| 2016/0112521 | A1* | 4/2016 | Lawson | H04L 67/16 709/227 |
| 2016/0378570 | A1* | 12/2016 | Ljubuncic | G06F 9/5027 718/104 |

OTHER PUBLICATIONS

David Carmona, [online]; [retrieved on Feb. 12, 2016]; retrieved from the Internet https://msdn.microsoft.com/en-us/library/ms973903.aspx. Carmona., "Programming the Thread Pool in the .NET Framework,", Jun. 2002, 24pp.

Barsanti L., et al.; Adaptive Job Scheduling Via Predictive Job Resource Allocation. Job Scheduling Strategies for Parallel Processing. JSSPP 2006. Lecture Notes in Computer Science, vol. 4376. 26 pages. (2007).

Pagano et al.; Computer-Aided Scheduling and Dispatching System: Impacts on Operations and Coordination, Urban Transportation Center, University of Illinois at Chicago. https://utc.uic.edu/wp-content/uploads/Strategic-Project-Plan-Computer-Assisted-Scheduleing-and-Dispatch1.pdf. 194 pages. Sep. 2000.

* cited by examiner

SCHEDULING REQUESTS IN AN EXECUTION ENVIRONMENT

BACKGROUND

Embodiments of the present invention relate to request scheduling and, more specifically, to scheduling requests in an execution environment.

In many cases, a middleware environment, such as WebSphere, hosting a software solution is configured to handle a certain load of requests. For instance, the various resources for the environment might be selected based on expected capacity, so as to achieve a desired level of performance. Despite this, the environment can suffer capacity problems, such as input or output bottlenecks or high memory of processor utilization. Such circumstances may have various causes, such as, for example, a sudden increase in requests, a network or disk failure, or a slowdown in a backend system.

The result of such capacity problems is that service-level agreements may be violated. For instance, increases in request processing times may occur, in violation of agreements with customers issuing those requests.

SUMMARY

According to an embodiment of this disclosure, a computer-implemented method includes receiving a plurality of requests. Resource utilization is determined for two or more resources in an execution environment. An at-risk resource is identified, from among the two or more resources, with highest utilization among the two or more resources. The method further includes determining, by a computer processor, a subset of requests to be approved that are estimated to have lowest impact on the at-risk resource, based at least in part on historical resource utilization applicable to one or more request types of the plurality of requests. The subset of requests is approved for processing by the execution environment, where the subset of requests excludes one or more unapproved requests. The one or more unapproved requests are held in a waiting queue in lieu of processing the one or more unapproved requests, responsive to the one or more unapproved requests not being approved.

In another embodiment, a system includes a memory having computer readable instructions and one or more processors for executing the computer readable instructions. The computer readable instructions include receiving a plurality of requests. Resource utilization is determined for two or more resources in an execution environment. An at-risk resource is identified, from among the two or more resources, with highest utilization among the two or more resources. The computer readable instructions further include determining a subset of requests to be approved that are estimated to have lowest impact on the at-risk resource, based at least in part on historical resource utilization applicable to one or more request types of the plurality of requests. The subset of requests is approved for processing by the execution environment, where the subset of requests excludes one or more unapproved requests. The one or more unapproved requests are held in a waiting queue in lieu of processing the one or more unapproved requests, responsive to the one or more unapproved requests not being approved.

In yet another embodiment, a computer program product for scheduling requests for execution includes a computer readable storage medium having program instructions embodied therewith. The program instructions are executable by a processor to cause the processor to perform a method. The method includes receiving a plurality of requests. Resource utilization is determined for two or more resources in an execution environment. An at-risk resource is identified, from among the two or more resources, with highest utilization among the two or more resources. The method further includes determining a subset of requests to be approved that are estimated to have lowest impact on the at-risk resource, based at least in part on historical resource utilization applicable to one or more request types of the plurality of requests. The subset of requests is approved for processing by the execution environment, where the subset of requests excludes one or more unapproved requests. The one or more unapproved requests are held in a waiting queue in lieu of processing the one or more unapproved requests, responsive to the one or more unapproved requests not being approved.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
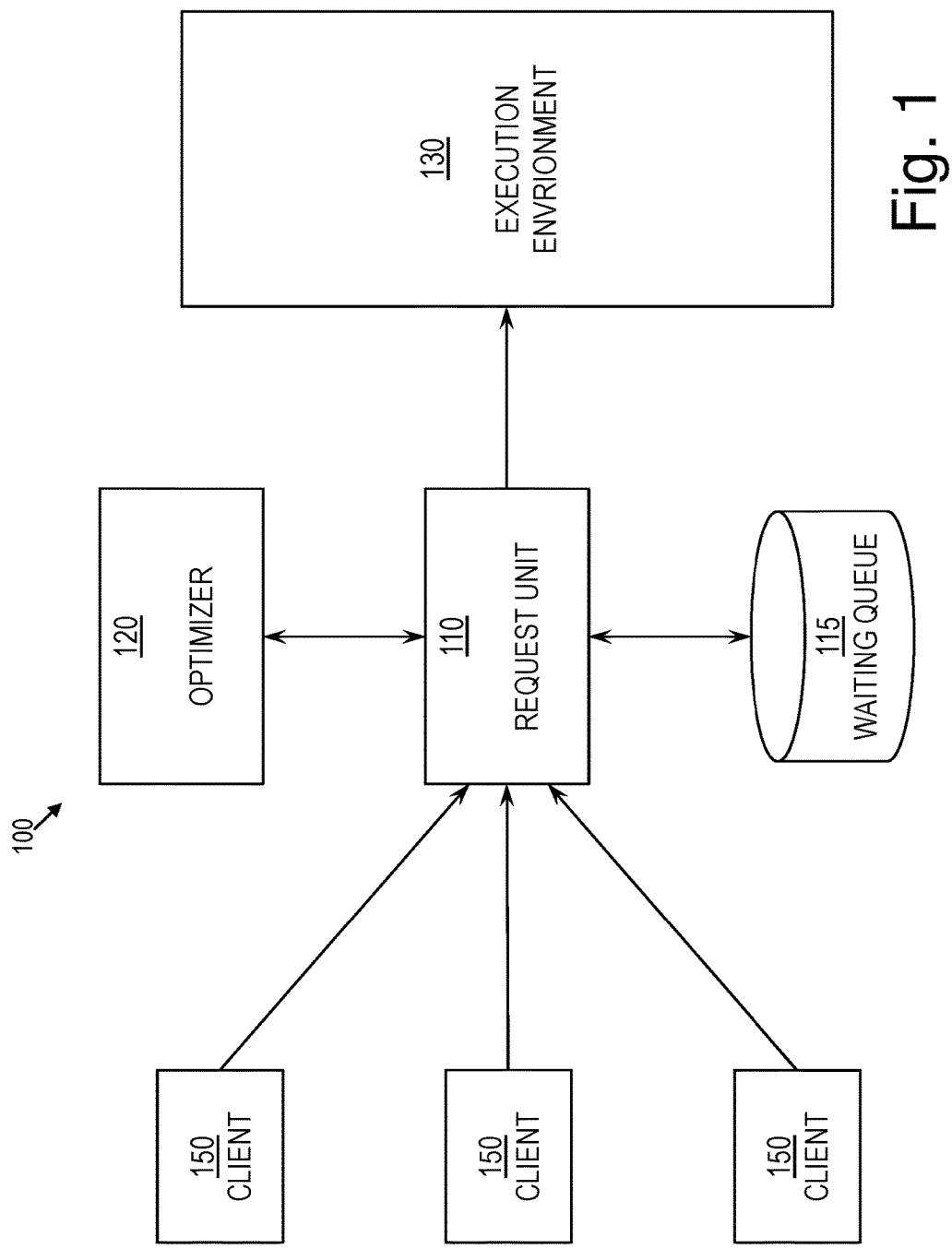
FIG. 1 is a block diagram of a scheduling system, according to some embodiments of this disclosure.

According to some embodiments of this disclosure, a scheduling system may reduce or avoid resource bottlenecks while ensuring compliance with service level agreements. FIG. 1 is a block diagram of the scheduling system 100, according to some embodiments of this disclosure.

As shown, the scheduling system 100 may include a request unit 110, a waiting queue 115, an optimizer 120, and an execution environment 130. Generally, the request unit 110 may receive requests from clients 150, which may be computing devices, and may store each request in the waiting queue 115 until the request is approved for execution; the optimizer may determine whether and when a request is approved; and the execution environment 130 may process approved requests. The request unit 110, the waiting queue 115, the optimizer 120, and the execution environment 130 may include hardware, software, or a combination of hardware and software. Further, while these components are illustrated in FIG. 1 as being distinct, it will be understood that they may share hardware, software, or both, or they may be further divided based on design choices.

Figure 2:
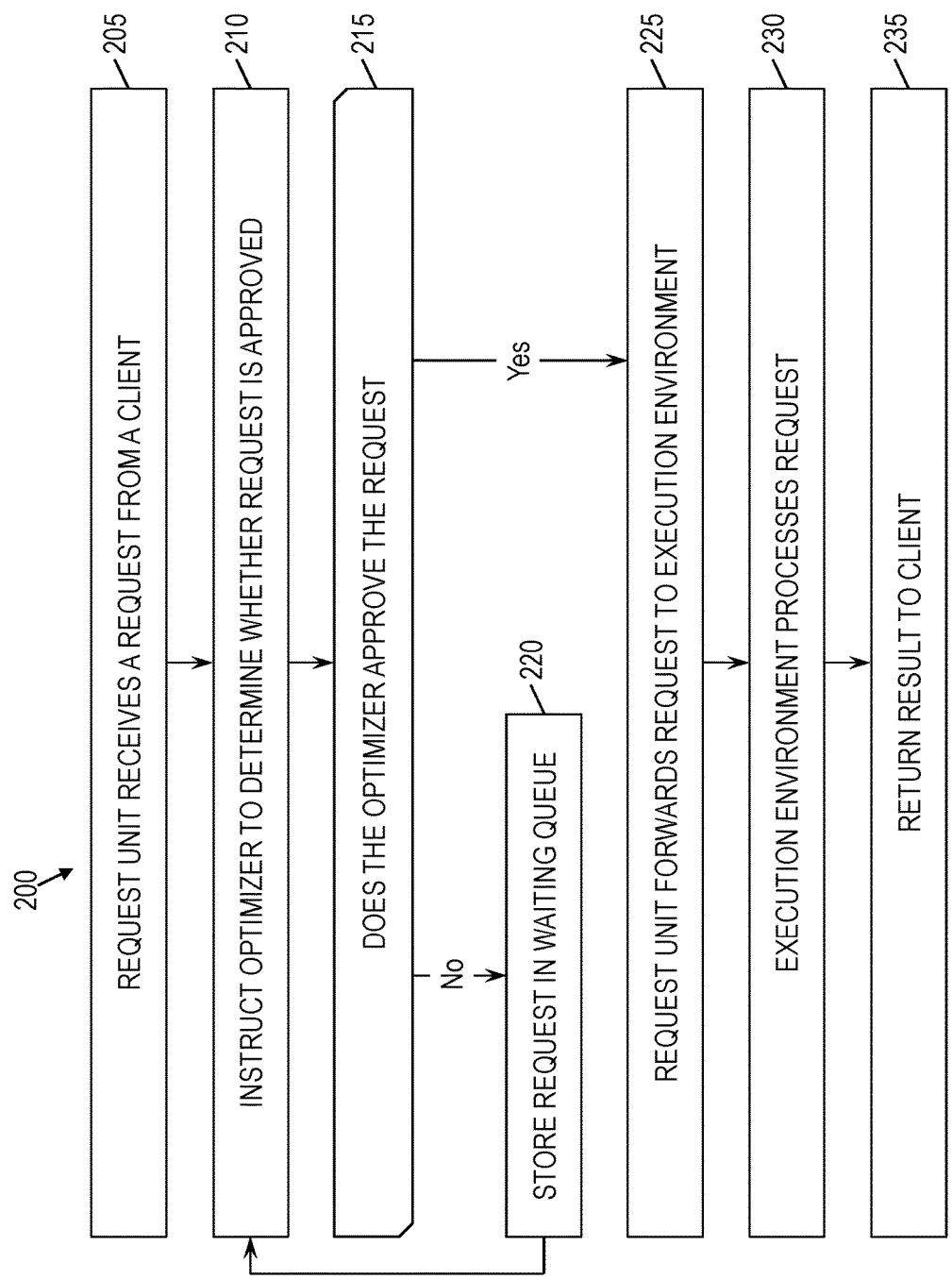
FIG. 2 is a flow diagram of a method for scheduling requests for execution, according to some embodiments of this disclosure.

FIG. 2 is a flow diagram of a method 200 for scheduling requests, according to some embodiments of this disclosure. Specifically, the method 200 refers to the processing of a single request, but it will be understood that the scheduling system 100 may manage multiple requests at a given time, and each such request may be handled in a manner the same or similar to that described with reference to FIG. 2.

As shown in FIG. 2, at block 205, the request unit 110 may receive a request. That request may be a request to execute a transaction, and may be associated with metadata describing the request or transaction.

The request unit 110 may be in communication with one or more clients 150, each of which may be a device configured to make requests for transactions executable by the execution environment 130. The request unit 110 may receive requests from these clients 150. In some embodiments, the clients 150 may direct their requests to the execution environment 130, and the request unit 110 may receive the requests by way of intercepting them on their way to the execution environment 130. In some embodiments, however, the clients 150 may direct their requests specifically to the request unit 110.

In some embodiments, the metadata associated with a request may include data provided by the client 150, data based on known service level agreements applicable the request, and historical data describing past execution of similar requests. For instance, a client 150 making a request may provide metadata for the request that includes the transaction to be executed, parameters for the transaction, and identification of the client 150. The scheduling system 100, such as by way of the request unit 110, may associate additional metadata with each request, based on service level agreements and historical data. For instance, based on service level agreements known to the scheduling system 100, the request unit 110 may determine requirements for the request, such as required response time, required throughput, and business value. It will be understood, however, that this information may additionally or alternatively be provided by the client 150.

The scheduling system 100 may monitor processing of requests by the execution environment 130 and may maintain historical data describing processing of requests. For example, and not by way of limitation, the scheduling system 100 may monitor processor utilization, memory utilization, input/output utilization, and execution time for various requests. Further, in some embodiments, each request may be categorized into a request type. Thus, the historical data may be categorized into request type as well, such that the scheduling system 100 is able to estimate execution characteristics for each request based on request type.

When a request is received, the request unit 110 may determine a request type of the request, which may be included in the metadata provided by client 150 or may be inferred from that metadata, and may estimate execution characteristics based on the request type. These estimated execution characteristics, such as resource utilization and execution time, may be associated with the request as further metadata.

At block 210, the request unit 110 may instruct the optimizer 120 to determine whether the request is approved for execution. More specifically, the request unit 110 may instruct the optimizer 120 to determine a set of requests that are approved, from among the various requests that have not yet been approved. In some embodiments, the request unit 110 does not forward a request to the execution environment 130 until that request is approved by the optimizer 120.

At decision block 215, the optimizer 120 may determine whether the request is approved for execution. This determination may be based on the various metadata described above and may be further based on the current state of the execution environment 130, such as resource utilization. In some embodiments, the optimizer 120 may make decisions about which requests to approve with an aim of minimizing, or reducing, resource utilization while maximizing, or increasing, the total count of requests processed or the frequency of requests being processing. As a result, the scheduling system 100 may reduce the likelihood of resource bottlenecks.

Generally, the optimizer 120 may periodically consider the requests not yet approved, as a group, and may select one or more of them for approval. For instance, upon instruction from the request unit 110, the optimizer 120 may approve one or more requests. The requests being considered for approval may include those that have been newly received, as well as those in the waiting queue 115 due to having been previously considered by the optimizer 120 but not yet approved.

Figure 3:
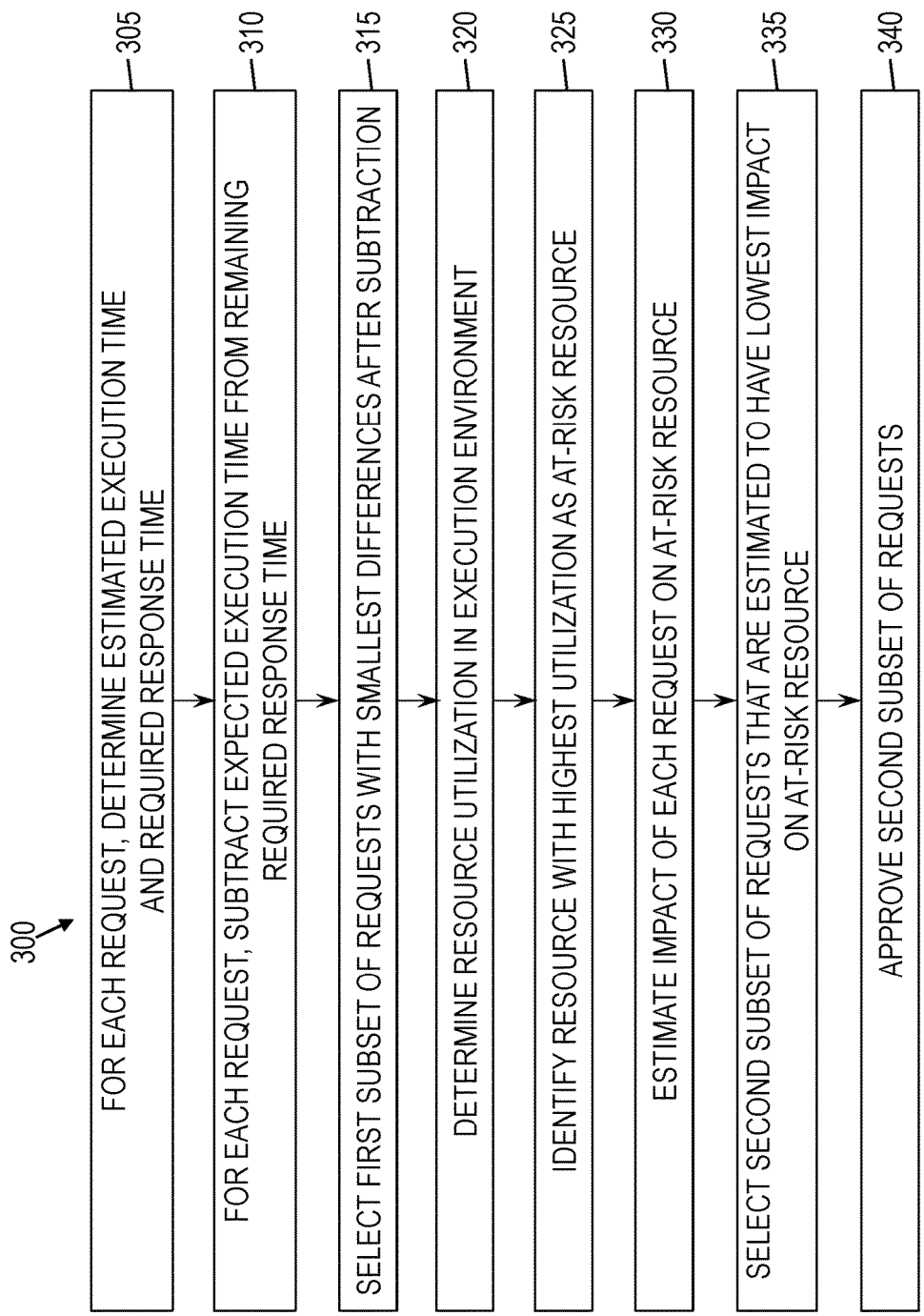
FIG. 3 is a flow diagram of a method for approving requests, according to some embodiments of this disclosure.

FIG. 3 is a flow diagram of a method 300 of the optimizer 120 for selecting one or more requests for approval, according to some embodiments of this disclosure.

At block 305, for each request being considered for approval, the optimizer 120 may determine an estimated execution time and a required response time. As described above, this information may be part of the metadata associated with each request. For example, and not by way of limitation, the estimated execution time may be determined based on historical data specific to the request type of each request, and the required response time may be based on a service level agreement applicable to the request.

At block 310, for each request, the optimizer 120 may subtract the expected execution time from the remaining required response time, where the remaining required response time is the required response time less the time passed since the request was made by the client 150. At block 315, the optimizer 120 may select a first subset of the requests that have the one or more smallest differences resulting from the subtraction. In other words, the requests selected may have the shortest times remaining until they are required to be completed. Moving forward in the method 300, only the requests in this first subset may be considered for approval while those not selected may remain in the waiting queue 115 until the method 300 restarts to approve additional requests.

In some cases, a request may be considered for execution multiple times, after having been rejected an initial time. In this case, as time passes between these multiple considerations, the difference between the remaining response time and expected execution time of that request may decrease over time. Thus, although a pending request may not be selected for the first subset during its initial consideration by the optimizer 120, as time passes the request may be more likely to be selected.

In some embodiments, additionally or alternatively to blocks 310 and 315, the optimizer may filter the requests based on meeting some other requirement. For example, if there is a throughput requirement in one or more service level agreements, only requests closest to potentially violating their applicable service level agreements with respect to throughput may remain in consideration as the method 300 moves forward. Analogously, for other requirements, the optimizer 120 may continue to consider only the requests deemed closest to violating those requirements.

At block 320, the optimizer 120 may determine the current resource utilization of the execution environment 130. Thus may include, for example, determination of processor utilization, memory utilization, disk read/write utilization, and network utilization. In some embodiments, this determination may be made based on the scheduling system's monitoring of requests being processed in the execution environment 130. At block 325, the optimizer 120 may identify which resource (e.g., processor, memory, disk, or network) has the highest utilization. This resource may be deemed to be the at-risk resource that is considered moving forward.

At block 330, the optimizer 120 may estimate the impact of each request on the at-risk resource identified above. As described above, the estimated resource utilization of a request may be part of the metadata for that request. For example, and not by way of limitation, the resource utilization of the at-risk resource may be estimated based on historical data specific to the request type of the request. The impact on resource utilization of the at-risk resource may thus be estimated based on a combination of the current resource utilization of the at-risk resource and the estimated resource utilization of the request with respect to that at-risk resource.

At block 335, from the requests still being considered, the optimizer 120 may select a second subset of requests. The second subset of requests may be one or more requests that are estimated to have a lowest impact (i.e., lowest increase) on the at-risk resource. At block 340, the optimizer 120 may approve the second subset of requests for execution, and may notify the request unit 110 of such approval. The optimizer 120 may reject, or not approve, the requests that are not in this second subset. The optimizer 120 may notify the request unit 110 of which requests are approved.

In addition to the above considerations of the optimizer 120, some embodiments of the scheduling system 100 may further consider the business value of the various requests when determining which to approve. An example of this is illustrated in FIG. 4, which is another flow diagram of a method 400 for selecting requests for execution, according to some embodiments.

Figure 4:
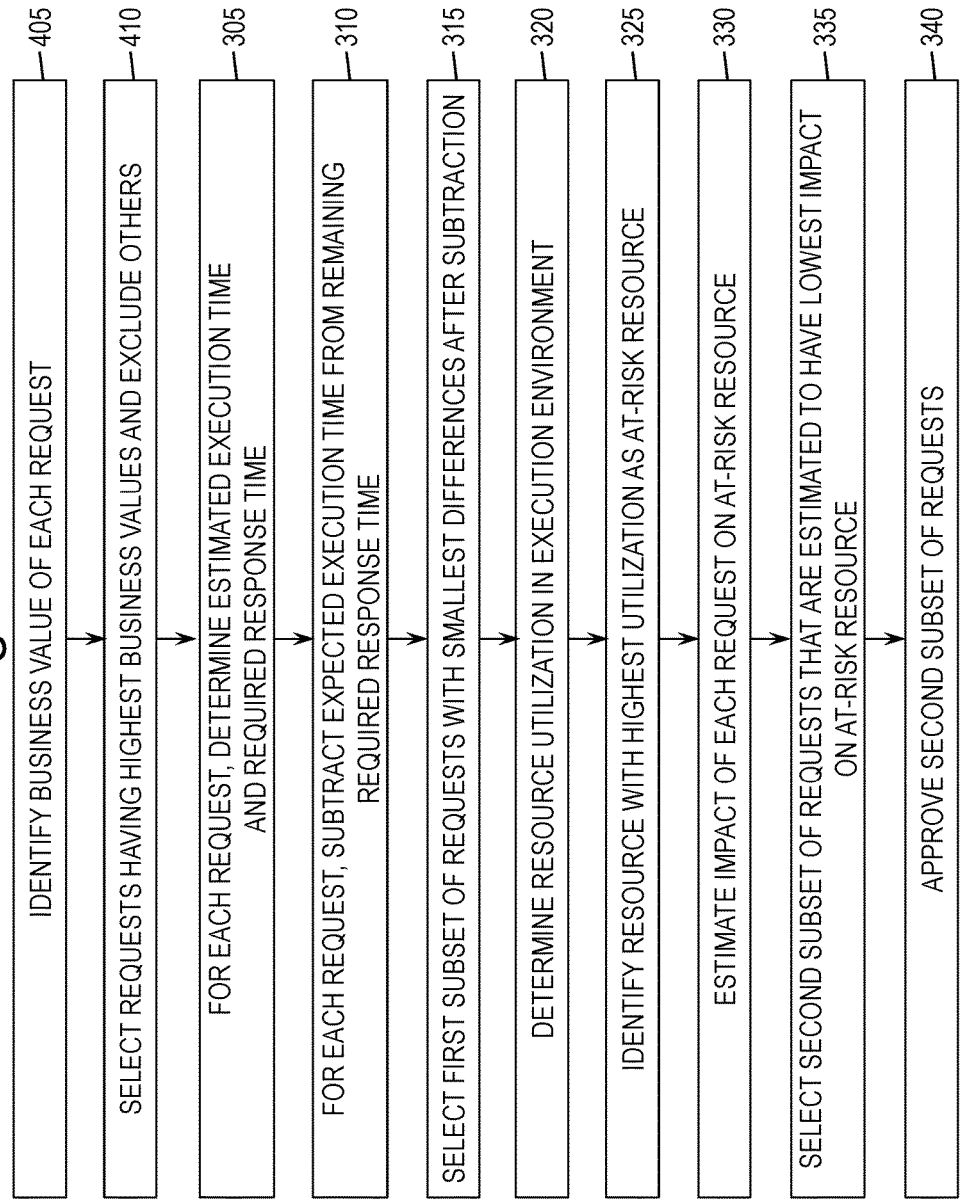
FIG. 4 is another flow diagram of a method for scheduling requests for execution, according to some embodiments of this disclosure.

As shown in FIG. 4, at block 405, given the set of requests not yet approved for execution, the optimizer 120 may identify the business value of each request. As discussed above, the business value of each request may be included in the metadata associated with the request. In some embodiments, this information may be based on a service level agreement or may be provided by the client 150 upon issuance of the request. The business value may take various representations. For example, and not by way of limitation, the business value may take the form of an integer that is a ranking relative to other possible business values.

At block 410, the optimizer 120 may select a subset of the requests having the highest one or more business values. In considering this group of requests moving forward in the method 400, the optimizer 120 may then exclude the requests not selected as part of this subset. Following block 410, the method 400 may continue with the same or similar operations as those described above with respect to FIG. 3. Thus, in some embodiments, certain requests with relatively low business values may end up in the waiting queue 115 until requests with higher business values have been approved for execution.

Referring back to FIG. 2, if the request is not approved for execution, then the request may be stored in the waiting queue 115, at block 220. For this request, the method 200 may repeat blocks 210 and 215 until the request is approved. Each request may be repeatedly considered by the optimizer 120 for approval until it is approved. Meanwhile, requests that are approved may be forwarded to the execution environment 130 for execution, without waiting on those still in the waiting queue 115.

If the request is approved, then at block 225, the request unit 110 may forward the request to the execution environment 130. At block 230, the execution environment 130 may process the request, such as by executing the transaction associated with the request. Given that the request was approved based in part on current resource utilization and the estimated resource utilization of processing the request, the request is not likely to cause a resource bottleneck in the execution environment 130. If the execution environment 130 has more requests than it can handle at a given time, the execution environment 130 may queue requests that it has received but is not yet actively processing. In that case, when the request reaches the front of the queue, the execution environment 130 may then execute that request.

After execution of the request, at block 235, a result of the execution may be returned to the client 150 that made the request. For example, and not by way of limitation, the execution environment 130 may respond to the client 150 with the result, or the execution environment 130 may forward the result to the request unit 110, which may respond to the client 150 with the result.

Figure 5:
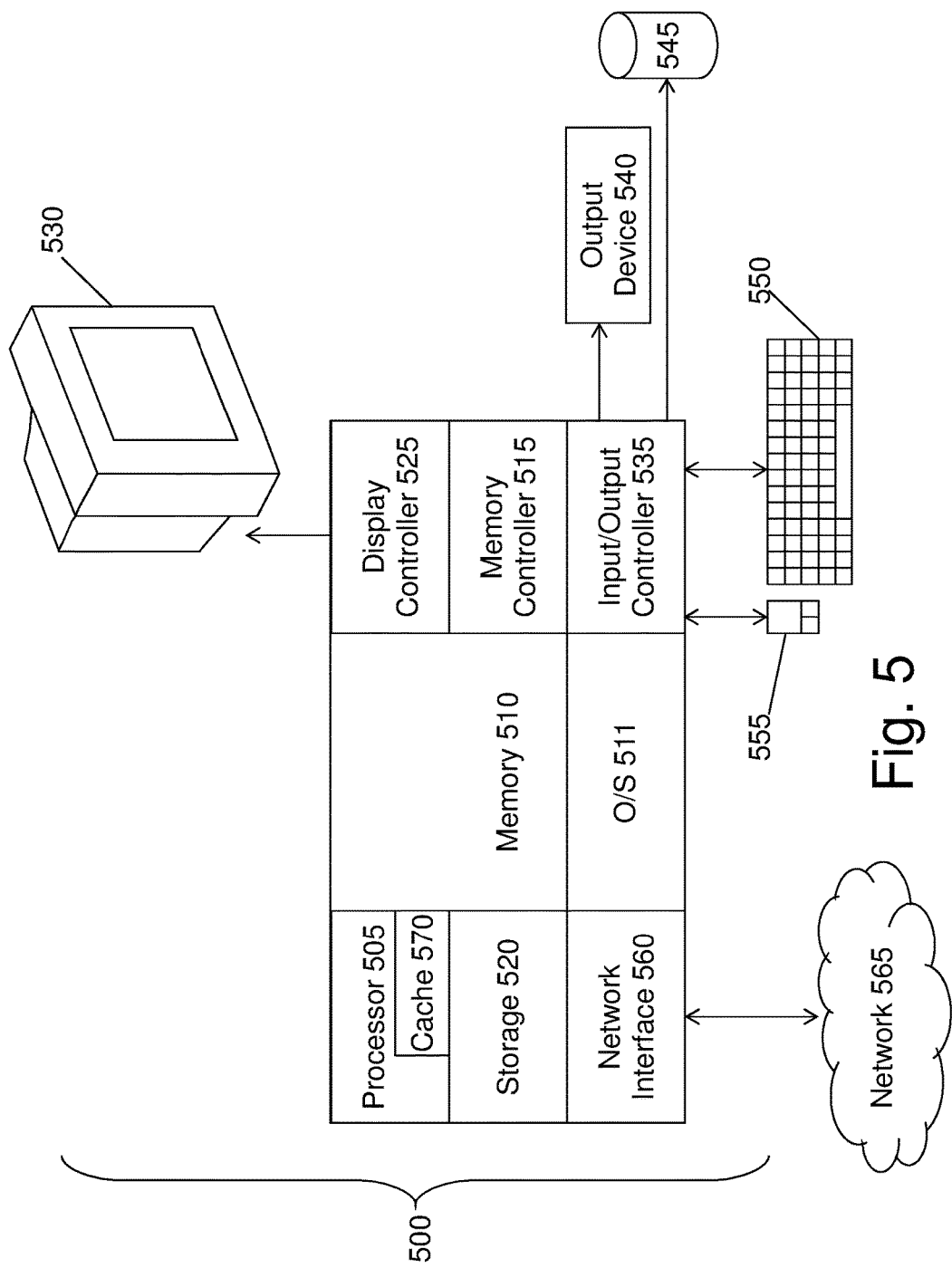
FIG. 5 is a block diagram of a computer system for implementing some or all aspects of the scheduling system, according to some embodiments of this disclosure.

FIG. 5 illustrates a block diagram of a computer system 500 for use in implementing a scheduling system 100 or method according to some embodiments. The scheduling systems and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the scheduling systems and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Scheduling systems and methods according to this disclosure may be embodied, in whole or in part, in computer program products or in computer systems 500, such as that illustrated in FIG. 5.

Technical effects and benefits of some embodiments include the ability to avoid or reduce resource bottlenecks potentially resulting from the processing of requests. Some embodiments of the scheduling system 100 may ensure that resources such as processor, memory, and network are used efficiently to process business transactions so as to comply with service level agreements and other requirements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a plurality of requests;
   detecting resource utilization of two or more resources in an execution environment, wherein the detecting the resource utilization comprises detecting at least one of memory utilization, disk utilization, processor utilization, and network utilization;
   identifying an at-risk resource, from among the two or more resources, with a highest resource utilization among the two or more resources;
   determining from among the plurality of requests, a final subset of requests to be approved that are estimated to have a lowest increase of the detected resource utilization of the at-risk resource, based at least in part on historical resource utilization applicable to one or more request types of the plurality of requests;
   approving the final subset of requests for processing by the execution environment, wherein the final subset of requests excludes one or more unapproved requests from the plurality of requests;
   executing the final subset of requests by the execution environment;
   temporarily holding the one or more unapproved requests in a waiting queue in lieu of processing the one or more unapproved requests, responsive to the one or more unapproved requests not being approved; and
   repeatedly, for each request in the one or more unapproved requests, performing the determining, approving, and executing.

2. The computer-implemented method of claim 1, further comprising maintaining a first request, of the one or more unapproved requests, in the waiting queue until the first request is approved based at least in part on respective metadata of the first request and the detected resource utilization of the two or more resources in the execution environment.

3. The computer-implemented method of claim 1, wherein the determining the final subset of requests that are estimated to have the lowest increase of the detected resource utilization of the at-risk resource comprises:
  monitoring the resource utilization of the two or more resources in the execution environment;
  generating, for each request type, historical data describing resource utilization of the two or more resources in the execution environment, based on the monitoring; and
  estimating an increase by each request of the plurality of requests on the resource utilization of the two or more resources based on a respective request type of the request and on the historical data applicable to the respective request type.

4. The computer-implemented method of claim 1, further comprising filtering the plurality of requests to one or more at-risk requests based on requirements applicable to execution of each request in the plurality of requests, wherein the final subset of requests to be approved is selected from the one or more at-risk requests.

5. The computer-implemented method of claim 1, further comprising:
  estimating, for each request of the plurality of requests, an execution time of the request;
  determining, for each request of the plurality of requests, a remaining required response time;
  selecting a preliminary subset of requests from among the plurality of requests, based on a difference for each request between the respective remaining required response time and the respective execution time; and
  wherein the determining, from among the plurality of requests, the final subset of requests to he approved that are estimated to have the lowest increase of the detected resource utilization of the at-risk resource comprises selecting the final subset of requests from the preliminary subset of requests.

6. The computer-implemented method of claim 5, wherein the determining, for each request of the plurality of requests, the required response time comprises consulting one or more service level agreements.

7. The computer-implemented method of claim 1, further comprising filtering the plurality of requests to one or more high-value requests based on a respective business value of each of the plurality of requests, wherein the final subset of requests to be approved is selected from the one or more high-value requests.

8. A system comprising:
  a memory having computer readable instructions; and
  one or more processors for executing the computer readable instructions, the computer readable instructions comprising:
    receiving a plurality of requests;
    detecting resource utilization of two or more resources in an execution environment, wherein the detecting the resource utilization comprises detecting at least one of memory utilization, disk utilization, processor utilization, and network utilization;
    identifying an at-risk resource, from among the two or more resources, with highest resource utilization among the two or more resources;
    determining, from among the plurality of requests, a final subset of requests to be approved that are estimated to have a lowest increase of the detected resource utilization of the at-risk resource, based at least in part on historical resource utilization applicable to one or more request types of the plurality of requests;
    approving the final subset of requests for processing by the execution environment, wherein the final subset of requests excludes one or more unapproved requests from the plurality of requests;
    executing the final subset of requests by the execution environment;
    temporarily holding the one or more unapproved requests in a waiting queue in lieu of processing the one or more unapproved requests, responsive to the one or more unapproved requests not being approved; and
    repeatedly, for each request in the one or more unapproved requests, performing the determining, approving, and executing.

9. The system of claim 8, the computer readable instructions further comprising, maintaining a first request, of the one or more unapproved requests, in the waiting queue until the first request is approved based at least in part on respective metadata of the first request and the detected resource utilization of the two or more resources in the execution environment.

10. The system of claim 8, wherein the determining the final subset of requests that are estimated to have the lowest increase of the detected resource utilization of the at-risk resource comprises:
  monitoring the resource utilization of the two or more resources in the execution environment;
  generating, for each request type, historical data describing resource utilization of the two or more resources in the execution environment, based on the monitoring; and
  estimating an increase by each request of the plurality of requests on the resource utilization of the two or more resources based on a respective request type of the request and on the historical data applicable to the respective request type.

11. The system of claim 8, the computer readable instructions further comprising filtering the plurality of requests to one or more at-risk requests based on requirements applicable to execution of each request in the plurality of requests, wherein the final subset of requests to be approved is selected from the one or more at-risk requests.

12. The system of claim 8, the computer readable instructions further comprising:
  estimating, for each request of the plurality of requests, an execution time of the request;
  determining, for each request of the plurality of requests, a remaining required response time;
  selecting a preliminary subset of requests from among the plurality of requests, based on a difference for each request between the respective remaining required response time and the respective execution time; and
  wherein the determining, from among the plurality of requests, the final subset of requests to be approved that are estimated to have the lowest increase of the detected resource utilization of the at-risk resource comprises selecting the of requests from the preliminary subset of requests.

13. The system of claim 12, wherein the determining, for each request of the plurality of requests, the remaining required response time comprises consulting one or more service level agreements.

14. The system of claim 8, the computer readable instructions further comprising filtering the plurality of requests to one or more high-value requests based on a respective business value of each of the plurality of requests, wherein the final subset of requests to be approved is selected from the one or more high-value requests.

15. A computer program product for scheduling requests for execution, the computer program product comprising a computer readable storage medium having program instructions embodied therewith, the program instructions executable by a processor to cause the processor to perform a method comprising:
- receiving a plurality of requests;
- detecting resource utilization of two or more resources in an execution environment, wherein the detecting the resource utilization comprises detecting at least one of memory utilization, disk utilization, processor utilization, and network utilization;
- identifying an at-risk resource, from among the two or more resources, with a highest resource utilization among the two or more resources;
- determining from among the plurality of requests, a final subset of requests to be approved that are estimated to have a lowest increase of the detected resource utilization of the at-risk resource, based at least in part on historical resource utilization applicable to one or more request types of the plurality of requests;
- approving the final subset of requests for processing by the execution environment, wherein the final subset of requests excludes one or more unapproved requests from the plurality of requests;
- executing the final subset of requests by the execution environment;
- temporarily holding the one or more unapproved requests in a waiting queue in lieu of processing the one or more unapproved requests, responsive to the one or more unapproved requests not being approved; and
- repeatedly, for each request in the one or more unapproved requests, performing the determining, approving, and executing.

16. The computer program product of claim 15, the method further comprising maintaining a first request, of the one or more unapproved requests, in the waiting queue until the first request is approved based at least in part on respective metadata of the first request and the detected resource utilization of the two or more resources in the execution environment.

17. The computer program product of claim 15, wherein the determining the final subset of requests that are estimated to have the lowest increase of the detected resource utilization of the at-risk resource comprises:
- monitoring the resource utilization of the two or more resources in the execution environment;
- generating, for each request type, historical data describing resource utilization of the two or more resources in the execution environment, based on the monitoring; and
- estimating an increase by each request of the plurality of requests on the resource utilization of the two or more resources based on a respective request type of the request and on the historical data applicable to the respective request type.

18. The computer program product of claim 15, the method further comprising filtering the plurality of requests to one or more at-risk requests based on requirements applicable to execution of each request in the plurality of requests, wherein the final subset of requests to be approved is selected from the one or more at-risk requests.

19. The computer program product of claim 15, the method further comprising:
- estimating, for each request of the plurality of requests, an execution time of the request;
- determining, for each request of the plurality of requests, a remaining required response time;
- selecting a preliminary subset of requests from among the plurality of requests, based on a difference for each request between the respective remaining required response time and the respective execution time; and
- wherein the determining, from among the plurality of requests, the final subset of requests to be approved that are estimated to have the lowest increase of the detected resource utilization of the at-risk resource comprises selecting the final subset of requests from the preliminary subset of requests.

20. The computer program product of claim 15, the method further comprising filtering the plurality of requests to one or more high-value requests based on a respective business value of each of the plurality of requests, wherein the final subset of requests to be approved is selected from the one or more high-value requests.

* * * * *